United States Patent
Flacke et al.

(10) Patent No.: US 6,833,807 B2
(45) Date of Patent: Dec. 21, 2004

(54) METHOD FOR ADAPTIVE TARGET PROCESSING IN A MOTOR VEHICLE RADAR SYSTEM

(75) Inventors: Joachim Flacke, Markdorf (DE); Bruno Kaiser, Oberschopfheim (DE); Kuno Heckel, Friedrichshafen (DE); Ralph Speck, Friedrichshafen (DE)

(73) Assignee: Automotive Distance Control Systems GmbH, Lindau (DE)

( * ) Notice: Subject to any disclaimer, the term of this patent is extended or adjusted under 35 U.S.C. 154(b) by 0 days.

(21) Appl. No.: 10/415,386
(22) PCT Filed: Oct. 24, 2001
(86) PCT No.: PCT/DE01/03987
§ 371 (c)(1), (2), (4) Date: Aug. 5, 2003
(87) PCT Pub. No.: WO02/35255
PCT Pub. Date: May 2, 2002

(65) Prior Publication Data
US 2004/0027273 A1 Feb. 12, 2004

(30) Foreign Application Priority Data
Oct. 26, 2000 (DE) .......................................... 100 53 061

(51) Int. Cl.$^7$ .............................................. G01S 13/93
(52) U.S. Cl. ...................... 342/70; 342/109; 342/195
(58) Field of Search ............................... 342/70, 71, 72, 342/89, 90, 91, 92, 104, 109, 111, 112, 115, 129, 162, 192, 195, 196

(56) References Cited

U.S. PATENT DOCUMENTS

| | | | |
|---|---|---|---|
| 4,078,234 A | | 3/1978 | Fishbein et al. |
| 5,760,732 A | * | 6/1998 | Marmarelis et al. ........ 342/145 |
| 5,842,156 A | | 11/1998 | Hong et al. |
| 5,943,003 A | | 8/1999 | Shollenberger |
| 6,373,427 B1 | * | 4/2002 | Hohne ........................ 342/128 |
| 2002/0030623 A1 | * | 3/2002 | Arikan et al. ............... 342/195 |

FOREIGN PATENT DOCUMENTS

| | | |
|---|---|---|
| DE | 4433775 | 3/1996 |
| GB | 2298538 | 9/1996 |

* cited by examiner

Primary Examiner—Thomas H. Tarcza
Assistant Examiner—Isam Alsomiri
(74) Attorney, Agent, or Firm—W. F. Fasse; W. G. Fasse

(57) ABSTRACT

A method for adaptive target processing in a vehicle the radar involves first detecting targets in the monitored environment with respect to their speed and location in a standard mode of the radar sensor, and then switching to a precision mode, in which the distance measuring range of the radar sensor is adapted to the target surroundings detected in the standard mode. More particularly, the measuring accuracy and/or resolution regarding speed is increased by increasing the time of observation within the distance measuring range adapted to the target surroundings.

12 Claims, 3 Drawing Sheets

METHOD FOR ADAPTIVE TARGET PROCESSING IN A MOTOR VEHICLE RADAR SYSTEM

BACKGROUND OF THE INVENTION

1. Field of the Invention

The invention relates to a method for adaptive target processing in a vehicle radar. The targets in the surrounding environment are first detected by speed and location in the standard mode of the radar sensor. After detection of the targets in the standard mode the method switches to a precision mode, in which the distance measuring range of the radar sensor is adapted to the target surroundings detected in the standard mode.

2. Description of the Related Art

Usually the radar sensors used in automobiles are used for the control of speed in traffic surroundings such as country roads or highhways. The boundary or limiting conditions for such applications are such that information on the surroundings are necessary for a distance range of approximately 10 m to 150 m. However, for city traffic or stop-and-go traffic it is necessary to measure down to a short distance ahead of the vehicle (<2 m).

In addition, there are specific traffic situations, e.g. two cars with nearly identical speed, in a passing maneuver in the detecting range of the radar antennas, in which the necessary target separation is not attained to a sufficient extent. Such cases require a secondary treatment, e.g. in a subsequent tracking filter. The tracking filter serves for tracking the single, individual targets detected by the radar device over time.

With radar systems the data cycle time, i.e. the time required for detecting the complete measuring range, is defined by the processing time for range finding (i.e. distance measurement) and Doppler measurement. With the popular systems for distance control in a vehicle this time is defined such that it meets the user requirements regarding accuracy of distance and speed measurement, while accepting the above-cited disadvantages.

The German patent publication DE 44 33 775 A1 discloses a method for adaptive target processing in a vehicle radar, which changes over between a normal mode and a precision mode with an extended resolution with regard to the distance.

SUMMARY OF THE INVENTION

It is an object of the invention to introduce an adaptive signal processing before the tracking filter, which makes it possible to cover the very short range just ahead of the antenna and to further improve the target separation.

This object is attained by the method according to the invention for adaptive target processing in a vehicle radar, in which the targets in the surrounding environment are detected by speed and location in the standard mode of the radar sensor, and then the method switches to a precision mode, in which the distance measuring range of the radar sensor is adapted to the target environment or surroundings detected in the standard mode.

In accordance with the present invention a precision mode with extended resolution and/or increased accuracy of measurement regarding speed and if necessary distance is introduced subsequent the above-described standard mode, in which the radar sensor detects targets by speed and distance with the resolution and measuring accuracy which is common for vehicle applications. Simultaneously, the distance measuring range of the radar is adapted to the target surroundings detected in the standard mode, i.e. in the precision mode merely a restricted distance measuring range is taken into consideration.

In case e.g. in the standard mode the detection shows a target or several targets in a given distance range, specifically this distance range can be detected within the precision mode and that with an extended speed resolution and/or speed measuring accuracy. In an advantageous embodiment in addition the distance resolution and/or the distance measuring accuracy can be increased.

Also cases are possible in which within the distance range adapted to the target surroundings merely the speed resolution and/or speed measuring accuracy is increased in the precision mode, the distance resolution and/or the distance measuring accuracy remaining constant.

In a particularly advantageous embodiment adaption of the distance measuring range while simultaneously increasing the resolution and/or measuring accuracy is performed in such manner that the data cycle time and thus the data renewal rate for the precision mode remains constant compared to the standard mode.

Consequently, the method according to the invention corresponds to the application of adaptive filters In signal processing, which filters may be adapted to the respective situation.

Thus an improved target separation and a very short range detection can be attained exclusively by altering the signal processing, without additional constructional measures being required at the radar sensor.

BRIEF DESCRIPTION OF THE DRAWINGS

The invention will be readily understood from the ensuing description of embodiment examples taken in conjunction with the drawings, wherein.

DESCRIPTION OF THE PREFERRED EMBODIMENTS

Figure 1:
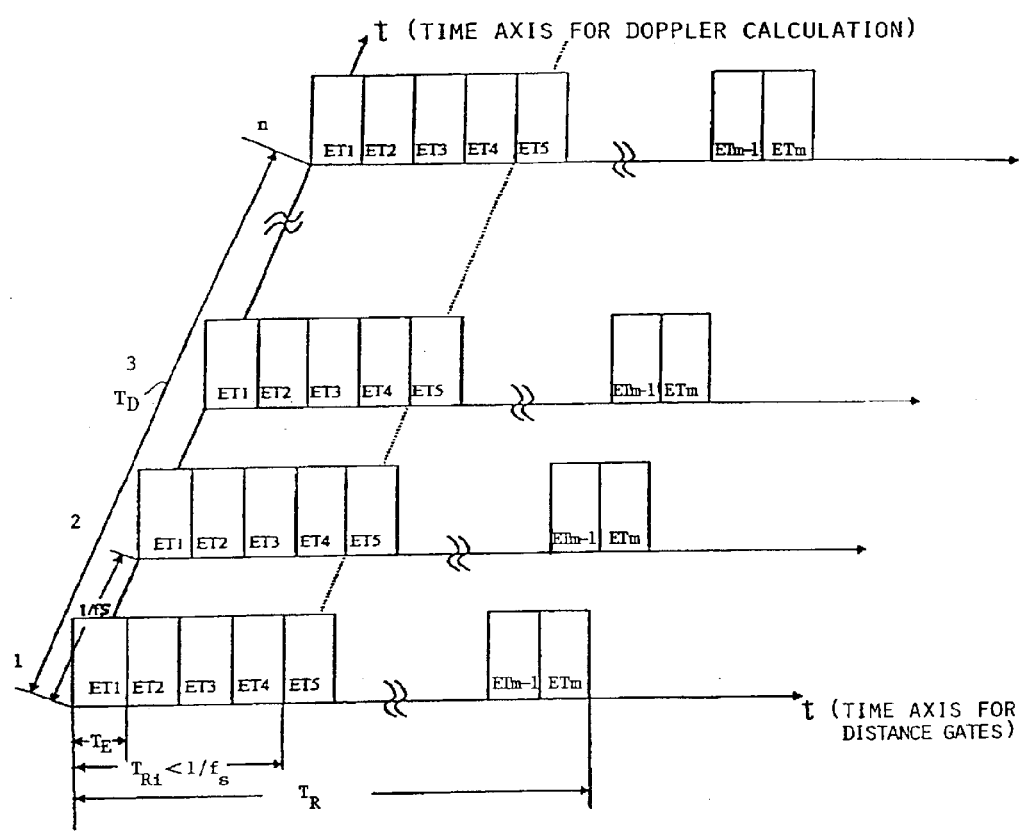
FIG. 1 is a diagram of "n" measuring sequences in succession on a time axis for Doppler processing, whereby each measuring sequence includes "m" distance gates in succession on a time axis for distance processing.

FIG. 1 shows an illustration of the distance gates and of the Doppler processing with a Doppler radar system. The axis pointing upward designates the time axis for the Doppler processing. $T_D$ designates the processing time for the Doppler determination. Fs is the Doppler sampling rate and 1/fs the temporal distance between two Doppler samples (serial no. 1, . . . n in FIG. 1). Typical values are: number n of the Doppler samples=64; 1/fs=20 µs. With a complex target data processing and for the frequency range of the vehicle radars the following results from these sizes:

Speed measuring range: +/−175 km/h

Speed resolution: ~5 km/h.

The horizontal axis designates the time axis for the individual distance gates. $T_R$ is the time for a data cycle, i.e. the time which is required to detect the complete measuring range. A typical value for $T_R$ is 1 µs. $T_E$ designates the width of a distance gate ETk with k=1, 2, ..., m. For application in a vehicle radar $T_R$ is usually smaller than $T_D$.

Common vehicle radars classify the distance measuring range into defined distance gates ETk, in which the speeds of the detected objects are determined with preset Doppler band widths. As an example: The length of the distance gates is approx. 5 m and the speed resolution is in the range of 5 km/h.

Several distance gates may be processed to blocks (width of a block: $T_{Ri}$) combined in the Doppler level, the Doppler processing for the distance gates of a block being effected parallel in time. For this purpose, e.g. a multi-channel receiver may be used. The time $T_R$ is subdivided into time segments $T_{Ri}$, which must equal the condition that.

$$T_{Ri} < 1/fs,$$

the sampling frequency fs of the Doppler processing having to fit Shannon's theorem for the maximum occurring Doppler frequency. The subdivision into time segments $T_{Ri}$ is advantageous in view of the limited storage place in the signal processing of the radar and permits optimization of the processing time (calculating time for transformations). In this way, for instance, when subdividing $T_R$ into 8 time segments $T_{Ri}$ the complete data cycle can be processed in a time $T_{Dat}$ of.

$$T_{Dat} = 8 * T_D.$$

With the method according to the present invention upon knowledge of the total surroundings—after detection of targets in the standard mode—it is changed over to a distance range, which corresponds to one or more time segments $T_{Ri}$, by having discovered the targets relevant for the control and which covers a part of the original distance range.

By extending the time of observation $T_D$ in this partial range and—optionally—by reducing the length of the distance gate ETk improvements with regard to resolution and/or measuring accuracy as to speed and if necessary distance can be attained. The relevant targets can now be examined at a closer look or can be more easily separated. Moreover, multiple reflections, which in particular in the very short range lead to measuring inaccuracies, can be better distinguished from direct reflections by the increased resolution/measuring accuracy.

With the reduction of the distance range with a simultaneously increased resolution and/or measuring accuracy for speed and if necessary distance a constant data renewal rate can be attained, thus permitting at any time a change over between both modes (total range in the standard mode—target range in the precision mode).

The two concepts subject to the present invention, namely extension of the time of observation in the Doppler determination and reduction of the length of the distance gates are further described hereinafter.

1. Reduction of the Length of a Distance Gate ETk

With pulse radars the length of a distance gate $T_e$ usually corresponds to the transmit pulse length T. The distance resolution with pulse radars can be improved by reducing T. Moreover, it is also possible with pulse radar systems to attain an improvement in distance determination by reducing the length of distance gate $T_E$ while maintaining T, however, at the cost of energy balance. Therefore, this embodiment is important for major targets for the very short range (high echo field intensity) or in the distance range.

In case of FM-CW radars (FM-CW: frequency modulated-continuous wave) the frequency deviation ΔF of the HF-signal defines the length of the distance gates, the individual distance gates being determined by band pass filters. Reduction of the length of the distance gates can be attained by increasing the frequency deviation ΔF. For this purpose principally two options are available:

1) by changing the slope of the frequency rise of the HF-signal (in case of triangle or sawtooth modulation) with an unaltered duration of a modulation period, or
2) by extending i.e. increasing the duration of the modulation period of the HF-signal with an unaltered slope of the frequency rise.

2. Extension of the Time of Observation $T_D$

Usually Doppler processing is performed after temporal integration of the echo signals (serial no. 1, ..., n in FIG. 1) within the same distance gate ETk. With a pulse radar, from each pulse a sample is gained for the Doppler processing. With a FM-CW radar, from each modulation period a sample is gained for the Doppler processing.

After scanning or sampling the echo signals integrated within a distance gate ETk in the time domain with a sampling frequency fs, a Fourier transform is performed on the scanned i.e. sampled values. This yields the spectral representation of the Doppler Signal, from which the Doppler frequency $f_D$ of the target can be detected, which interrelates with the target speed via the equation:

$$v_z = f_D * \lambda_0 / 2$$

wherein $\lambda_0$ = wavelength of the HF-signal.
The temporal length of the scanning $$T_D = n/fs$$

defines the Doppler resolution $\Delta f_D$ $$\Delta f_D = 1/T_D.$$

Figure 2:
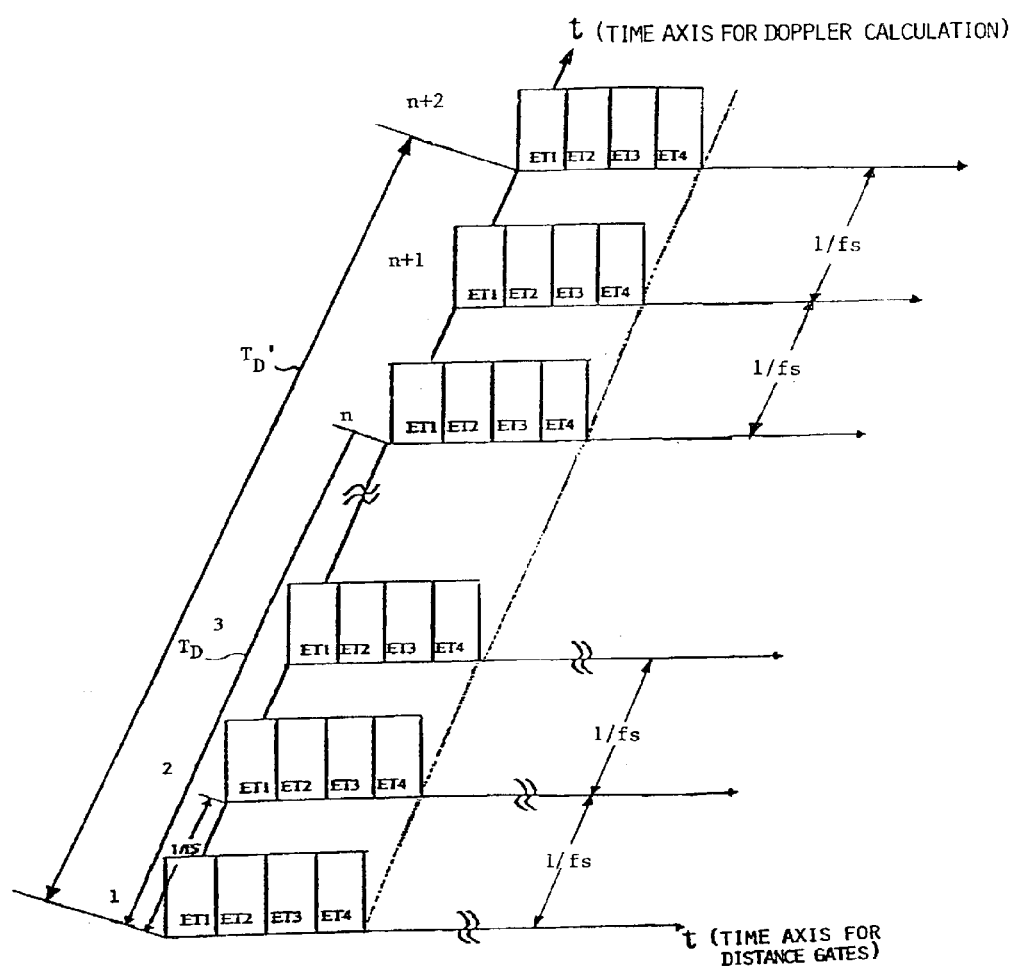
FIG. 2 is a diagram similar to FIG. 1, but showing the precision mode with an increased observation time $T_D'$, the same Doppler sample time spacing (1/fs) and an increased number (n+2) of Doppler samples (n+2 measuring sequences) in comparison to FIG. 1.
Figure 3:
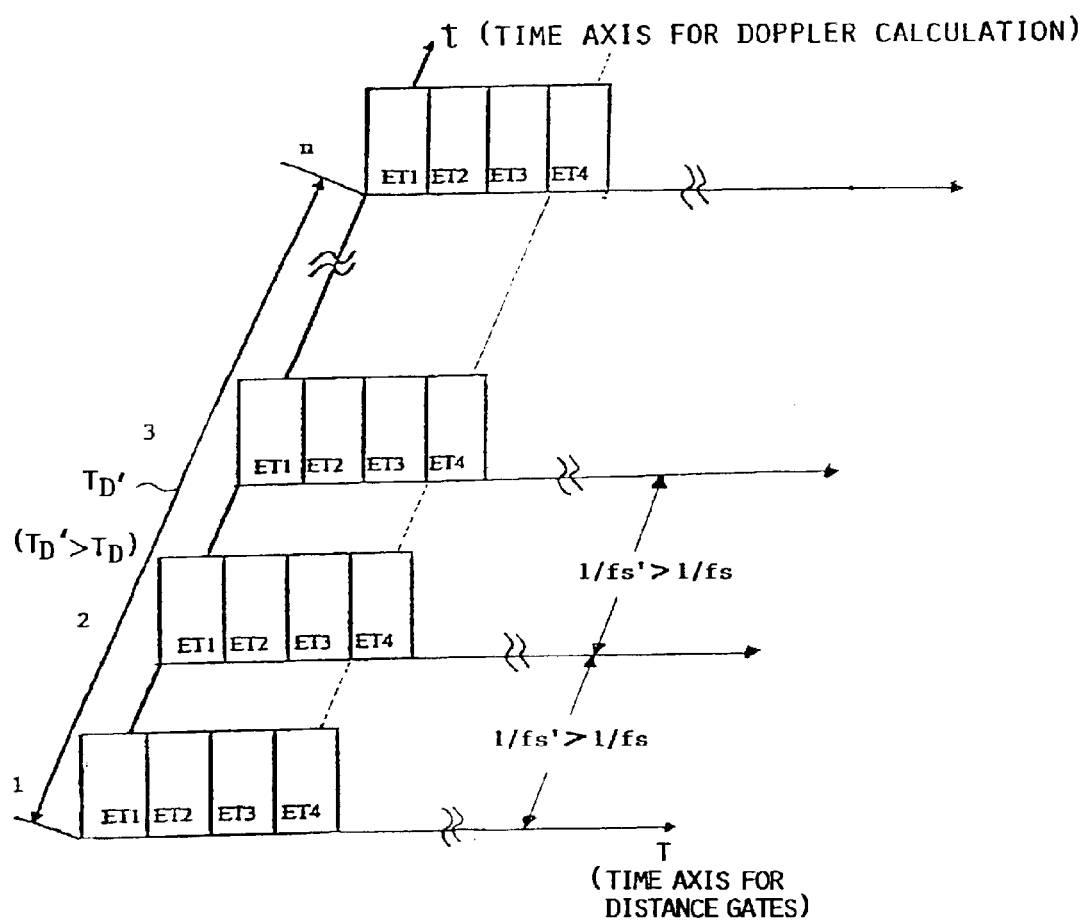
FIG. 3 is a diagram similar to FIG. 1, but showing the precision mode with an increased observation time $T_D'$, an increased Doppler sample time spacing (1/fs'), and the same number "n" of Doppler samples in comparison to FIG. 1.

With the method according to the present invention in the precision mode, while maintaining the sample rate fs the observation time or sampling duration $T_D$ can be increased. e.g. to $T_D'$, and thus the filter bandwidth in the Doppler processing can be reduced, i.e. the speed resolution can be improved by increasing the number n of the samples, e.g. to n+2, while maintaining the same Doppler sample time spacing 1/fs, as shown in FIG. 2. The same effect of an increase of $T_D$ to $T_D'$ is attained by reducing the sampling frequency fs to fs', i.e. increasing the Doppler sample time spacing from 1/fs to 1/fs', and maintaining the same number n of the samples, as shown in FIG. 3. However, reducing the sampling frequency fs results in a reduction of the uniquely detectable speed range.

What is claimed is:

1. A method for adaptive target processing in a vehicle radar, comprising steps of detecting at least one target in the surroundings by speed and location in a standard mode of a radar sensor over a first total observation time, thereafter switching from the standard mode to a precision mode, in which a distance measuring range of the radar sensor is adapted to target surroundings of the target that was detected in the standard mode, wherein a measuring accuracy and/or resolution regarding the speed of the target is increased in the precision mode compared to the standard mode by using an increased second total observation time of observation within the distance measuring range adapted to the target surroundings, wherein said increased second total observation time in the precision mode is greater than the first total observation time in the standard mode.

2. The method as set forth in claim 1, wherein a data renewal rate for the precision mode remains unaltered compared to the standard mode.

3. The method as set forth in claim 1, further comprising increasing a number of Doppler samples and maintaining an unaltered Doppler sampling rate in the precision mode compared to the standard mode.

4. The method as set forth in claim 1, further comprising reducing a Doppler sampling rate and maintaining an unaltered number of Doppler samples in the precision mode compared to the standard mode.

5. The method as set forth in claim 1, further comprising increasing a measuring accuracy and/or resolution regarding distance by reducing a length of distance gates within the distance measuring range adapted to the target surroundings, in the precision mode compared to the standard mode.

6. The method as set forth in claim 5, wherein a pulse radar is used as the radar sensor, further comprising reducing a transmit pulse length of pulses emitted by the pulse radar, in combination with the reducing of the length of the distance gates, in the precision mode compared to the standard mode.

7. The method as set forth in claim 5, wherein a pulse radar is used as the radar sensor, further comprising maintaining a constant transmit pulse length of pulses emitted by the pulse radar, in combination with the reducing of the length of the distance gates, in the precision mode compared to the standard mode.

8. The method as set forth in claim 5, wherein a FM-CW radar is used as the radar sensor, further comprising increasing a transmitter frequency deviation of the FM-CW radar, in the precision mode compared to the standard mode.

9. The method as set forth in claim 8, wherein the increasing of the transmitter frequency deviation is performed by increasing a slope of a frequency rise within a modulation period with an unaltered duration of the modulation period, in the precision mode compared to the standard mode.

10. The method as set forth in claim 8, wherein the increasing of the transmitter frequency deviation is performed by extending a duration of a modulation period with an unaltered slope of a frequency rise, in the precision mode compared to the normal mode.

11. The method as set forth in claim 1, further comprising suppressing multiple reflections in a very short range of the radar sensor.

12. A target detection and processing method in a vehicle radar system, comprising the steps:

a) using said radar system, emitting a radar signal into a monitored environment and receiving a return reflection signal reflected from a target in said monitored environment;

b) processing said return reflection signal with reference to at least one measuring succession of distance gates to determine a distance of said target and with respect to a Doppler shift among a plurality of said measuring successions of distance gates to determine a speed of said target;

c) carrying out said steps a) and b) in a standard mode, in which each said measuring succession of distance gates extends over a standard distance measuring range, and in which said plurality of measuring successions are carried out successively over a standard total measuring time to initially detect said target;

d) after said step c), carrying out said steps a) and b) in a precision mode, in which each said measuring succession of distance gates extends over a limited distance measuring range that is smaller than said standard distance measuring range and is limited to a range vicinity around said target, and in which said plural measuring successions are carried out successively over an increased total measuring time that is greater than said standard total measuring time, so as to increase at least one of a measuring accuracy and a measuring resolution of said speed of said target in said precision mode compared to said standard mode.

* * * * *

UNITED STATES PATENT AND TRADEMARK OFFICE
CERTIFICATE OF CORRECTION

PATENT NO. : 6,833,807 B2
DATED : December 21, 2004
INVENTOR(S) : Flacke et al.

It is certified that error appears in the above-identified patent and that said Letters Patent is hereby corrected as shown below:

Column 2,
Line 25, after "filters", replace "In" by -- in --.

Column 3,
Line 61, after "gate", replace "$T_e$" by -- $T_E$ --;
Line 62, after "length", replace"T." by -- $\tau$. --;
Line 63, after "reducing", replace "T." by -- $\tau$. --;
Line 66, after "maintaining", replace "T," by -- $\tau$, --.

Signed and Sealed this

Nineteenth Day of April, 2005

JON W. DUDAS
*Director of the United States Patent and Trademark Office*